United States Patent [19]
Cullen

[11] Patent Number: 5,899,247
[45] Date of Patent: May 4, 1999

[54] ADJUSTABLE ANCHOR WING FOR AN AGRICULTURAL BAGGING MACHINE

[75] Inventor: Steven R. Cullen, Astoria, Oreg.

[73] Assignee: Versa Corp., Astoria, Oreg.

[21] Appl. No.: 09/002,700

[22] Filed: Jan. 5, 1998

[51] Int. Cl.[6] ..................................................... B65B 1/04
[52] U.S. Cl. .......................... 141/313; 141/114; 141/73; 53/527
[58] Field of Search .................................... 141/114, 313, 141/317, 73, 74, 80; 53/527, 567, 570, 576; 100/65–67, 148

[56] References Cited

U.S. PATENT DOCUMENTS 1,175,157  3/1916  Ludden ...................................... 141/73
5,425,220  6/1995  Cullen ....................................... 53/527
5,464,049  11/1995 Cullen ...................................... 141/114

*Primary Examiner*—Steven O. Douglas
*Attorney, Agent, or Firm*—Zarley, McKee, Thomte, Voorhees & Sease; Dennis L. Thomte

[57] ABSTRACT

An adjustable anchor wing is provided for an agricultural bagging machine which not only acts as an anchor against premature movement of the machine as the bag is being filled, but also controls the density of the material being packed in an agricultural bag. The adjustable wing is supported by a pair of longitudinally movable cables with the cables being connected to the wing to enable the wing to be moved from a fully retracted position to a fully extended position.

9 Claims, 3 Drawing Sheets

ADJUSTABLE ANCHOR WING FOR AN AGRICULTURAL BAGGING MACHINE

BACKGROUND OF THE INVENTION

1. Field of the Invention

This invention relates to an agricultural bagging machine and more particularly to an adjustable anchor wing for an agricultural bagging machine.

2. Description of the Related Art

Agricultural feed bagging machines have been employed for several years to pack or bag silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor or the like which conveys the silage into a tunnel on which the bag is positioned so that the bag is filled. As silage is loaded into the bag, the bagging machine moves away from the filled end of the bag in a controlled fashion so as to achieve uniform compaction of the silage material within the bag. In U.S. Pat. No. 4,337,805, silage is forced by means of a rotor from the intake chamber of the machine through the output chamber of the machine and into the agricultural bag with a backstop structure yieldably engaging the closed end of the agricultural bag to resist the movement of the bagging machine away from the filled end of the agricultural bag as silage is forced into the bag. The structure of the '805 patent includes a pair of drums rotatably mounted on the bagging machine with a brake associated therewith for braking or resisting the rotation of the drum with a selected brake force. A cable is wrapped around the drum and is connected to the backstop.

Although the cable drum and backstop structure of the '805 patent and other similar machines do function generally satisfactorily, the cables, which are positioned on opposite sides of the bag, can create openings or holes in the bag which will adversely affect the fermentation process within the bag. A further disadvantage of the cable drum and backstop structure of the devices such as shown in the '805 patent is that the cables must be rewound after the filling of an individual bag. A further disadvantage of the cable drum and backstop structure of the machine such as disclosed in the '805 patent is that a dangerous condition exists should one of the cables break.

In an effort to overcome some of the disadvantages of machines such as disclosed in the '805 patent, an attempt was made in U.S. Pat. No. 4,621,666 to achieve the desired bagging operation while eliminating the need for the cable drum and backstop structure. In the '666 patent, the wheels on the bagging machine were braked to provide the desired resistance to the filling of the bag. Although the brake system of the '666 patent apparently met with some success, it is believed that machines such as disclosed in the '666 patent experience slippage difficulties in wet field conditions which adversely affect the bagging operation. It is also believed that the brake means alone on the bagging machine such as those disclosed in the '666 patent do not achieve the desired compaction of the silage material within the bag.

In applicant's U.S. Pat. No. 5,297,377, a bagging machine is described which has the capability of enabling the density of the silage material to be selectively controlled without the need of an elaborate braking system. In applicant's U.S. Pat. No. 5,297,377, a density control means is described which included a plurality of cables which are positioned in the flow of the silage material being bagged. In order to vary the density of the material in the machine of the '377 patent, more or less cables are employed based on the material being packed. For example, corn silage flows easy and would require more cables while alfalfa packs hard and would use less cables.

In applicant's U.S. Pat. No. 5,425,220, a density control means is described which includes a pair of intersecting cables positioned in the flow of the silage material being bagged. In order to vary the density of the material in the machine of the '220 patent, the relationship of the intersecting or crisscrossing cables is varied. In applicant's U.S. Pat. No. 5,671,594, a fixed beveled press plate is disclosed for use with a density control cable.

Although the use of the density control cables in applicant's previous patents such as U.S. Pat. No. 5,671,594 has met with success, the adjustment of the cable sloop takes approximately ten feet of machine movement before the adjusted cable loop becomes completely effective.

SUMMARY OF THE INVENTION

An agricultural feed bagging machine is disclosed which comprises a wheeled frame having rearward and forward ends. A tunnel is provided on the wheeled frame and has an intake end for receiving silage material or the like and an output end adapted to receive the mouth of an agricultural bag. A hopper or feed table is provided on the wheeled frame for receiving the material to be bagged and is adapted to supply the same to a feed compression means such as a rotatable rotor which forces the material into the tunnel and into the bag. First and second cables extend rearwardly from the frame into the tunnel and have an adjustable anchor wing assembly operatively connected thereto. The adjustable anchor wing assembly includes a primary hub which is connected to the rearward end of the first cable. A pair of wing members are pivotally secured to the primary hub and may be moved between retracted and extended positions. A center adjustment hub is pivotally connected to the wing members through a linkage for moving the wing members between their retracted and extended positions. The rearward end of the second cable passes through the primary hub and is secured to the center adjustment hub. Forward movement of the first cable while the second cable is moved rearwardly causes the wing members to be pivotally moved from their extended position to their retracted position. Conversely, rearward movement of the first cable while simultaneously moving the second cable forwardly causes the wing members to be pivotally moved from their retracted position to their extended position. As the bagging machine packs material into the bag and the bagging machine moves away from the bagged material, the adjustable anchor wing assembly is pulled through the material being bagged to act as an anchor to hold the machine from rolling ahead prematurely. The anchoring effect of the anchor wing assembly is varied by pivotally moving the wing members between their extended and retracted positions.

It is therefore a principal object of the invention to provide an adjustable anchor wing assembly for use on an agricultural bagging machine.

Still another object of the invention is to provide an adjustable anchor wing assembly for use on an agricultural bagging machine wherein the assembly acts as an anchor in the material being bagged to prevent the bagging machine from rolling ahead prematurely.

Still another object of the invention is to provide an adjustable anchor wing assembly which enables the density of the packed material to be precisely controlled with the adjustment of the adjustable wing assembly being substantially simultaneous.

Yet another object of the invention is to provide an adjustable anchor wing assembly which may be mounted on a conventional agricultural bagging machine without extensive modifications thereof.

Still another object of the invention is to provide an adjustable anchor wing assembly for use on an agricultural bagging machine which is economical of manufacture and durable in use.

These and other objects will be apparent to those skilled in the art.

DESCRIPTION OF THE PREFERRED EMBODIMENT

Figure 1:
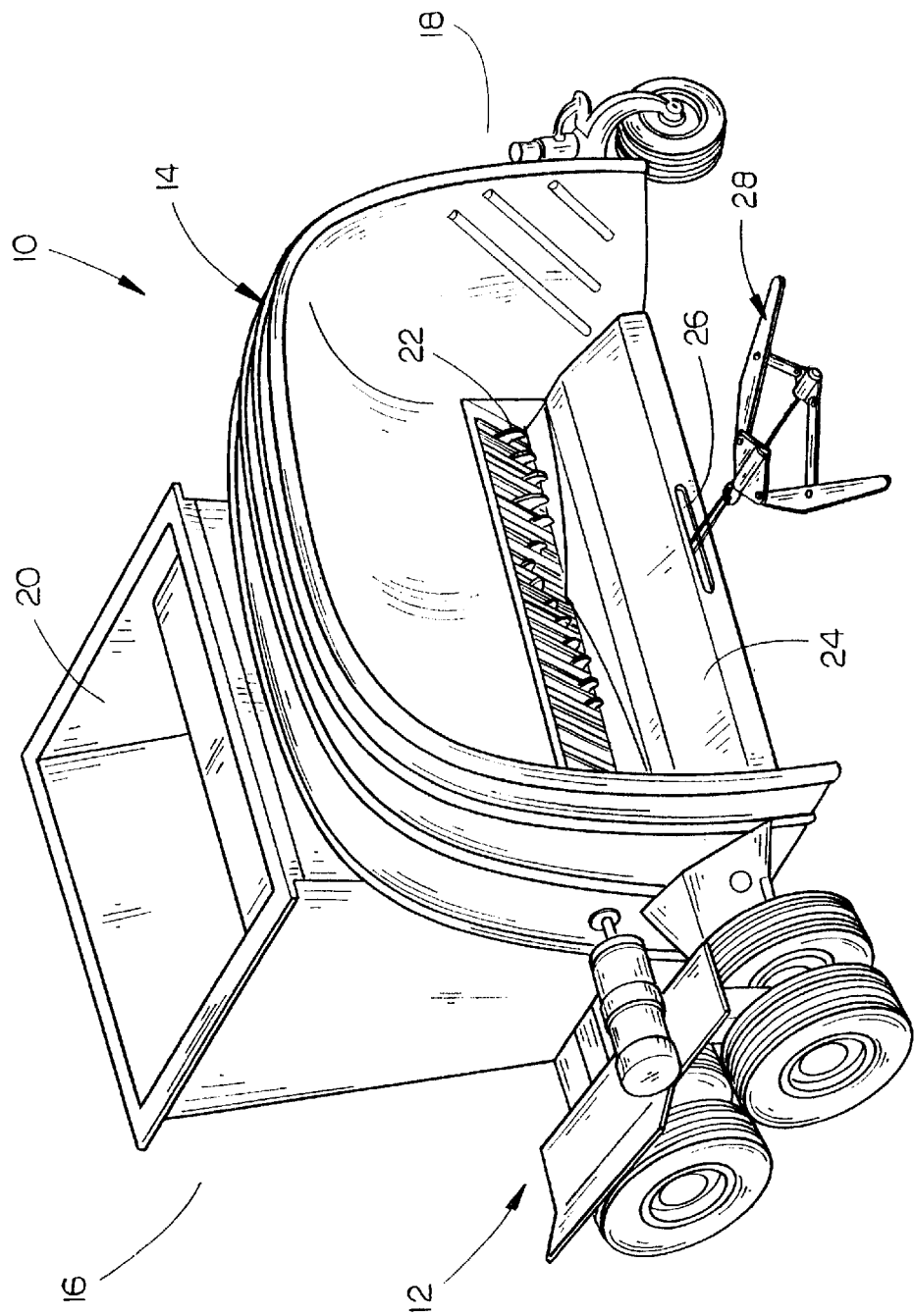
FIG. 1 is a rear perspective view of an agricultural bagging machine having the adjustable anchor wing assembly of this invention mounted thereon.
Figure 2:
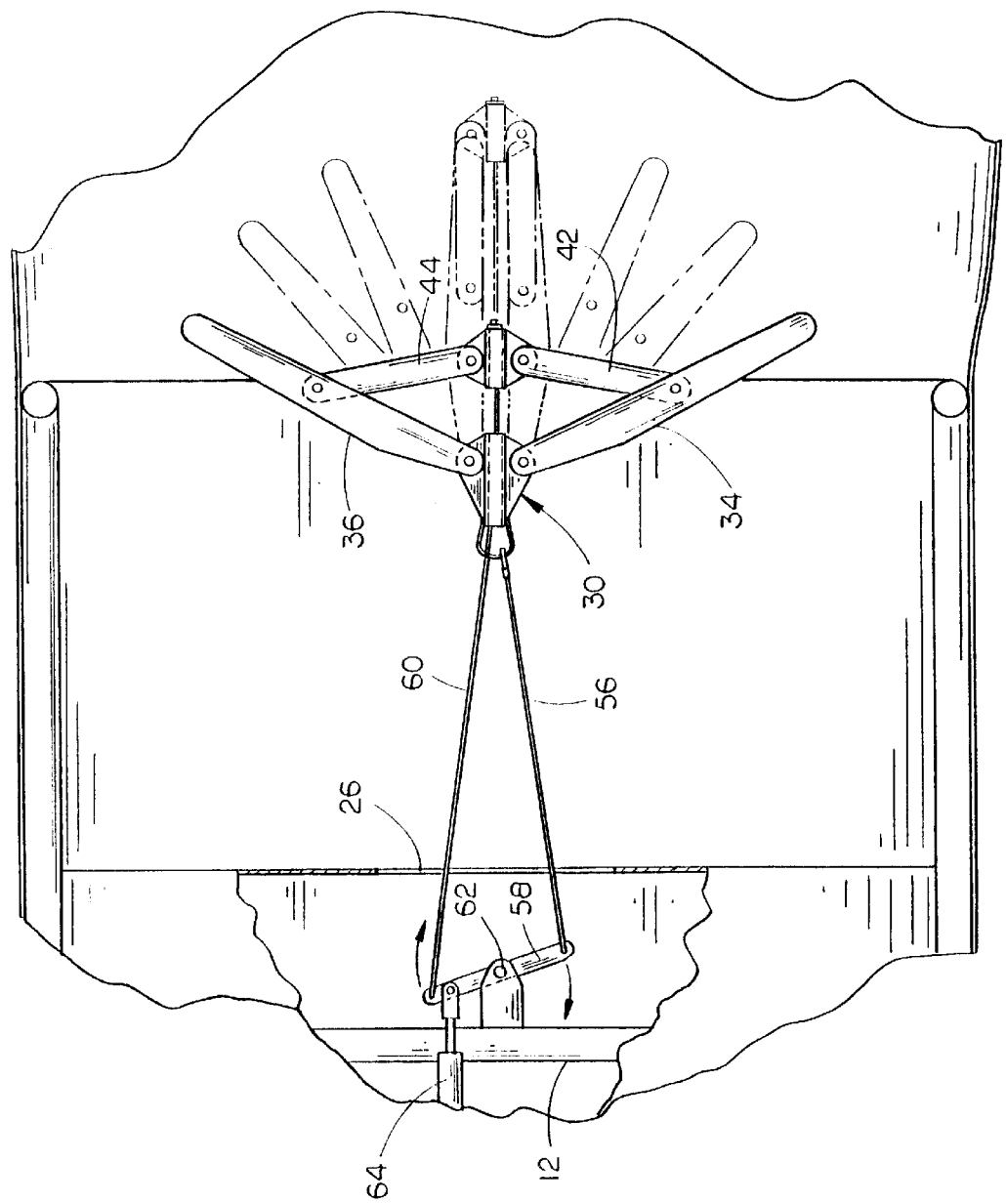
FIG. 2 is a top elevational view of the anchor wing assembly of this invention with the broken lines illustrating the various positions to which the anchor wing assembly may be moved.

The numeral 10 refers generally to an agricultural bagging machine such as disclosed in U.S. Pat. No. 5,671,594. Machine 10 includes a wheeled frame 12 having a tunnel 14 mounted thereon upon which is normally positioned the open mouth of a conventional agricultural bag. Although the preferred embodiment includes a wheeled frame, a non-wheeled frame could also be employed. For purposes of conciseness, the power means for driving the various components of the machine will not be disclosed, since the same does not form a part of the invention. The power means could be an engine mounted on the machine or it could be a power takeoff (PTO) shaft connected to a tractor PTO.

For purposes of description, the bagging machine 10 will be described as including a forward end 16 and a rearward end 18. Bagging machine 10 includes a hopper means 20 or other material receiving means, such as a feed table, conveyors or the like, at the forward end thereof which is adapted to receive the material to be bagged from a truck, wagon, etc. A horizontally disposed rotatable rotor 22 of conventional design is located at the lower end of the hopper means 20 for forcing the material to be bagged into the tunnel 14 and into the bag in conventional fashion. Although a horizontally disposed rotor is disclosed, it is possible that other types of material compression or compaction means could be employed such as augers, packers, etc.

For purposes of description, frame 12 includes a floor 24 located beneath rotor 22 and which extends rearwardly therefrom. Floor 24 is provided with an elongated opening 26 formed in its rearward end. It is to the bagging machine described above that the adjustable anchor wing assembly 28 is mounted. Anchor wing assembly 28 includes a primary or main hub 30 having a central opening 32 extending therethrough. Wing members 34 and 36 are pivotally connected to the opposite sides of hub 30 by bolts 38 and 40, respectively. Links 42 and 44 are pivotally connected to wing members 34 and 36 by bolts 46 and 48, respectively. The other ends of the links are pivotally connected to a center adjustment hub 50 by means of bolts or pins 52 and 54, respectively.

Figure 3:
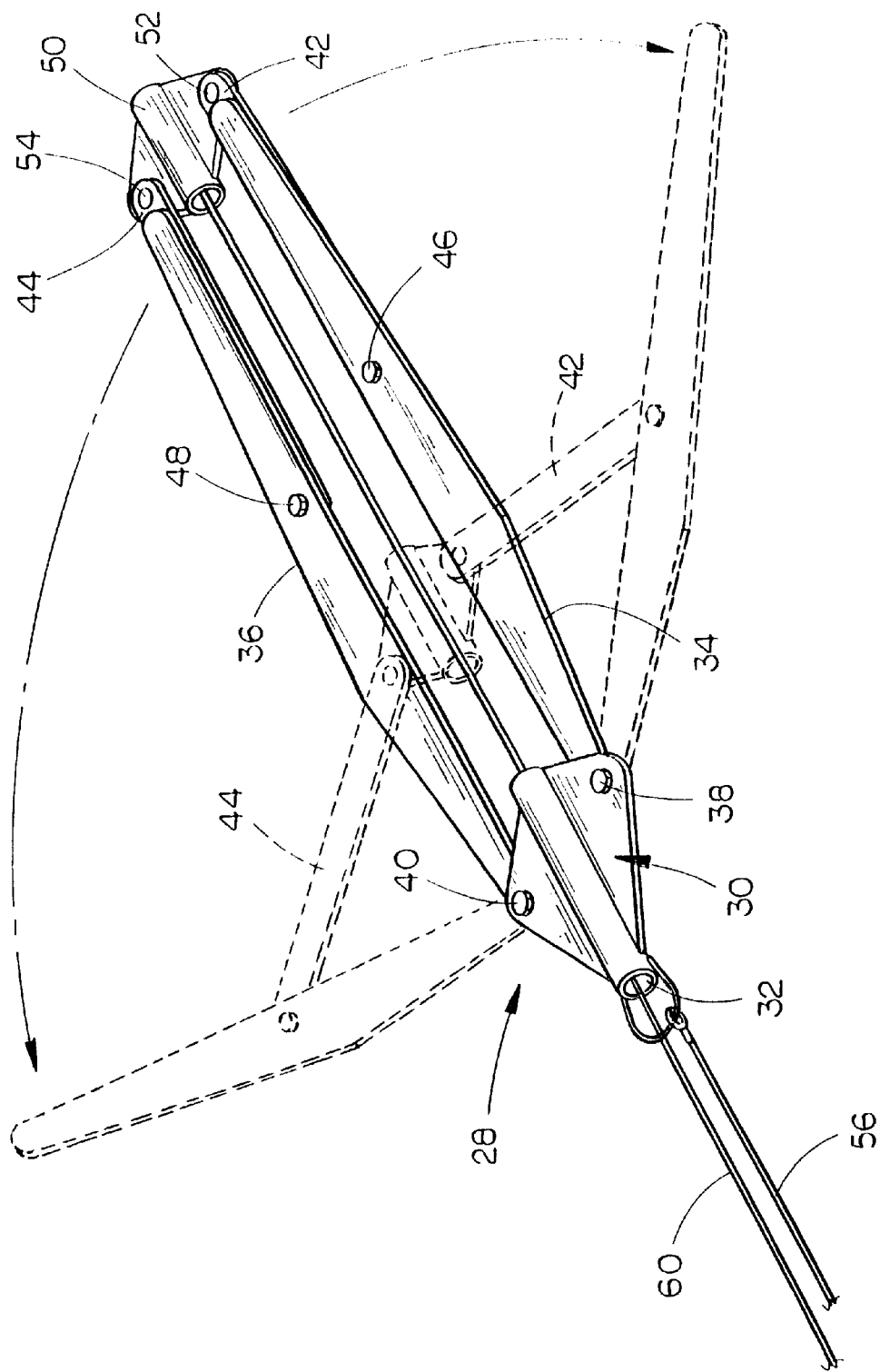
FIG. 3 is a perspective view of the anchor wing assembly of this invention.

The numeral 56 refers to a first cable having its forward end secured to one end of an elongated arm 58. The other end of cable 5.6 is secured to primary hub 30, as seen in the drawings. The numeral 60 refers to a second cable which has its forward end secured to the other end of elongated arm 58 and which has its rearward end operatively secured to center adjustment hub 50. As seen in FIG. 3, cable 60 passes through hub 30. Arm 58 is operatively pivotally secured to frame 12 by pivot pin 62. A power cylinder 64 is connected to arm 58 for pivotally moving arm 58 about pin 62. Retraction of the power cylinder 64 causes the cable 60 to be moved forwardly while cable 56 is moved rearwardly. Conversely, extension of the cylinder rod of the power cylinder 64 causes the cable 60 to be moved rearwardly while the cable 56 is moved forwardly. When the cylinder rod of the power cylinder 64 is completely extended, the wing members 34 and 36 are in their retracted position, as illustrated in FIG. 3. When it is desired to move the wing members 34 and 36 to their extended position, power cylinder 64 is retracted which causes cable 60 to be moved forwardly while cable 56 is moved rearwardly, thereby causing the wing members 34 and 36 to be pivotally moved from their retracted position illustrated in solid lines in FIG. 3, to the extended position illustrated by broken lines in FIG. 3. Preferably, the wing members 34 and 36 will be at substantially right angles to the direction of material flow when in their extended positions.

The adjustable anchor wing assembly of this invention, by being positioned at the rear of the tunnel, causes the assembly of this invention to act as an anchor to hold the machine from rolling ahead prematurely. It is recommended that the wing be positioned no closer to the rotor than four feet, although varying situations may arise wherein it is desirable to more closely position the wing assembly to the rotor. The positioning of the wing assembly as described herein permits the wing assembly to stream through moving mass in a natural taut condition and location, vertically and horizontally. It can be appreciated that the more extended the wing members are, the greater resistance to the machine moving away from the packed bag will be present. When the wing assembly is in its completely closed position, the least amount of packing density will be achieved in the filled bag. When the wing assembly is in its completely extended position, the greatest amount of packing density will be achieved in the filled bag. Thus, the adjustable anchor wing assembly of this invention provides an adjustable density control. The adjustment of the anchor wing assembly is instantaneous and the affect on the density of the material is immediate. When a cable loop is used as the density control means, it takes approximately ten feet of machine movement before the new adjusted cable loop width is completely effective.

During the bagging operation, as the bag is almost filled, the wing assembly of this invention is adjusted to the least amount of width at about ten feet from the intended end of the bag. This gives the wing enough time (distance) to close completely. The closed wing can then be pulled from the packed mass without much power being required and in a manner which does not significantly disturb the packed mass.

Thus it can be seen that a novel adjustable anchor wing assembly has been provided for an agricultural bagging machine which accomplishes at least all of its stated objectives.

I claim:

1. A bagging machine for bagging material into bags having a closed end and an open mouth, comprising:

a wheeled frame having rearward and forward ends;

a tunnel on said wheeled frame having an intake end for receiving the material to be bagged and an output end adapted to receive the open mouth of the bag;

said tunnel having opposite sides;

a material receiving means on said wheeled frame forwardly of said tunnel for receiving the material to be bagged;

a material packing means on said wheeled frame at the intake end of said tunnel for forcing the material to be bagged into said tunnel and into said bag;

and an adjustable anchor wing assembly positioned rearwardly of the intake end of said tunnel so as to be in the path of material being placed in the bag;

said adjustable anchor wing assembly resisting the movement of said bagging machine away from the bagged material;

said adjustable anchor wing assembly being selectively movable between retracted and extended positions thereby providing a means for controlling the density of the bagged material in the bag.

2. The bagging machine of claim 1 wherein said adjustable wing assembly comprises at least a pair of selectively movable wing members.

3. The bagging machine of claim 2 wherein said wing members are pivotally connected together and are selectively movable between said retracted position and said extended position.

4. The bagging machine of claim 1 wherein said adjustable anchor wing assembly comprises:

a support cable means secured to said frame means and extending rearwardly therefrom, and a pair of selectively movable wing members mounted on the rearward end of said support cable means.

5. A bagging machine for bagging material into bags having a closed end and an open mouth, comprising:

a wheeled frame having rearward and forward ends;

a tunnel on said wheeled frame having an intake end for receiving the material to be bagged and an output end adapted to receive the open mouth of the bag;

said tunnel having opposite sides;

a material receiving means on said wheeled frame forwardly of said tunnel for receiving the material to be bagged;

a material packing means on said wheeled frame at the intake end of said tunnel for forcing the material to be bagged from said material receiving means into said tunnel and into said bag;

a first elongated cable having forward and rearward ends;

said first cable having its forward end operatively secured to said frame and extending rearwardly therefrom;

a second elongated cable having forward and rearward ends;

said second cable having its forward end operatively secured to said frame and extending rearwardly therefrom;

connection means connecting said forward ends of said first and second cables to said frame whereby one of said cables may be moved in a first longitudinal direction with the other cable being moved in a longitudinal direction opposite to said first longitudinal direction;

and an adjustable anchor wing assembly secured to the rearward ends of said first and second cables whereby said anchor wing assembly will be pulled through the material being bagged as said bagging machine moves away from the bagged material to variably resist the movement of said bagging machine away from the bagged material;

said adjustable anchor wing assembly including a primary hub having at least first and second wing members pivotally secured thereto which may be moved between extended and retracted positions with respect to said primary hub;

a center adjustment hub operatively pivotally secured to said wing members rearwardly of said primary hub;

the rearward end of said first cable being secured to said primary hub;

the rearward end of said second cable being connected to said center adjustment hub;

the forward longitudinal movement of said second cable while said first cable is longitudinally moved rearwardly causing wing members to be moved to their said extended position;

the rearward longitudinal movement of said second cable while said first cable is longitudinally moved forwardly causing said wing members to be moved to their said retracted position.

6. The bagging machine of claim 5 wherein said second cable passes through said center adjustment hub.

7. The bagging machine of claim 5 wherein first and second linkages pivotally connected said center adjustment hub to said first and second wing members, respectively.

8. The bagging machine of claim 5 wherein said connection means comprises an elongated arm pivotally connected, intermediate its length, to said frame; the forward end of said first cable being secured to one end of said elongated arm; the forward end of said second cable being secured to the other end of said elongated arm; and means for pivotally moving said elongated arm.

9. The bagging machine of claim 8 wherein said means for pivotally moving said elongated arm comprises a power cylinder.

* * * * *